Figure 1:
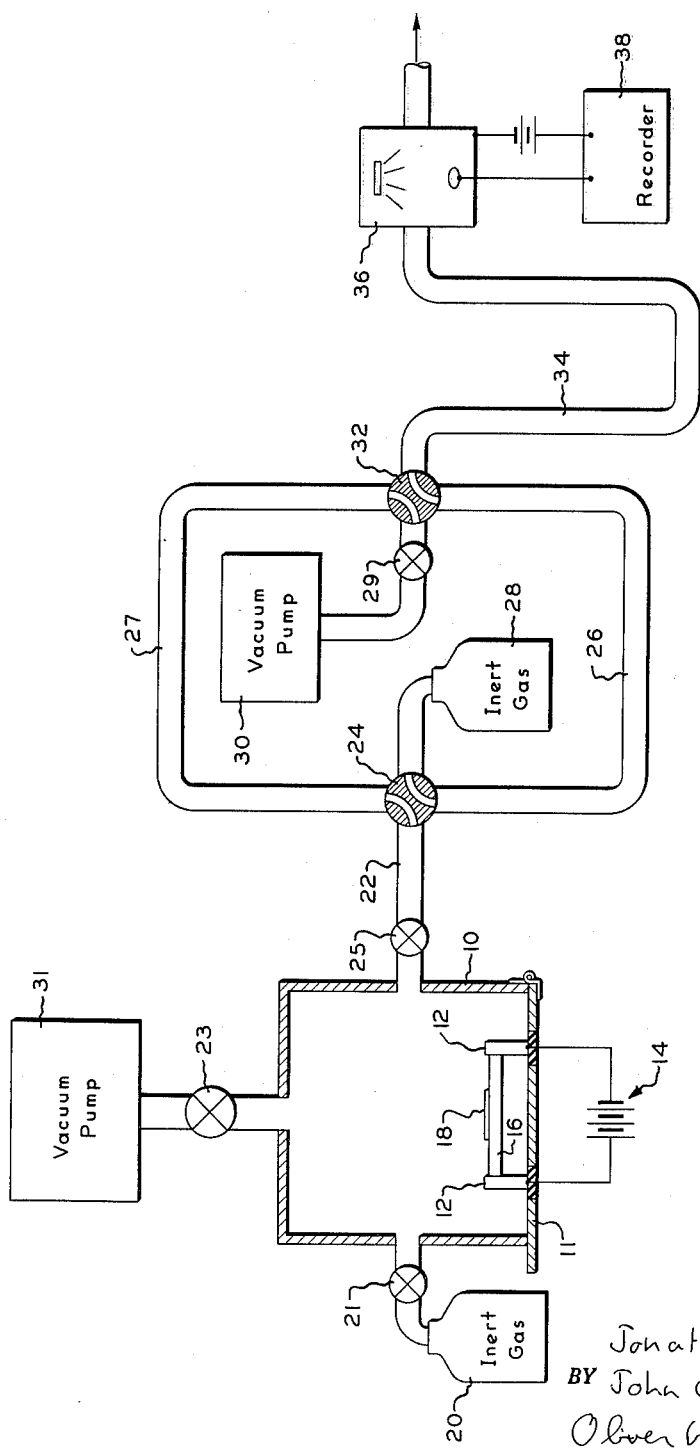

United States Patent Office 3,065,060
Patented Nov. 20, 1962

3,065,060
METAL ANALYSIS APPARATUS
Jonathan R. Roehrig, Sudbury, and John C. Simons, Jr., Belmont, Mass., assignors to National Research Corporation, Cambridge, Mass., a corporation of Massachusetts
Filed Mar. 5, 1958, Ser. No. 719,436
2 Claims. (Cl. 23—253)

This invention relates to gas determination in metals. More specifically this invention concerns apparatus which removes gases from metal samples, separates the gases and measures the quantity of each of the separated components.

One object of this invention is to produce an apparatus and method for analyzing gases in metals quickly and inexpensively. Another object of this invention is to provide an apparatus comprising a novel combination of gas liberation, gas separation and gas detection elements for use as a gas-in-metals detector employing in part the principles of gas chromatography. A further object is to provide a basic apparatus which, with minor modifications, can be used to analyze for hydrogen, oxygen or nitrogen present in a metal sample. A specific object is to provide an apparatus for analyzing oxygen in metals by using carbon reduction for freeing the oxygen from the metal sample and utilizing a means for separating the gases and detecting them which avoids such disadvantages as time-consuming volumetric measurement and costly spectrographic analysis.

Other objects will in part be obvious and will in part appear hereinafter.

The presence of residual gas in metals has been found to affect the characteristics of the metals. The presence of occluded oxygen and of oxides in steel, for example, has been found to be especially detrimental to the strength of steel. Hydrogen, nitrogen, and other gases create like effects. In order to control the quality of metals being produced, analytical methods and equipment for measuring the amount of gases in metals are required. The vacuum fusion analysis has thus far been regarded as the most practical method of gas determination in most cases. In the vacuum fusion method, oxygen is removed from the metal sample by carbon reduction in vacuum. Carbon monoxide is thus formed. Nitrogen and hydrogen are removed in the process of removing oxygen. The carbon monoxide and hydrogen are oxidized to carbon dioxide and water, respectively. By a process employing selective freezing and volumetric measuring, the amounts of the various gases are measured. Each determination takes considerable time and the volumetric measuring apparatus is expensive. The vacuum fusion method is not suitable for analyzing a melt of metal prior to pouring because of the time factor. Other methods of determination have been contrived, but in each case, where there is a saving of time in making a determination, there has invariably been a sizeable increase in the cost of the apparatus utilized. As an example, emission spectrographic determination of oxygen in metals requires expensive and complicated light emission comparison apparatus. The apparatus of this invention is less expensive than the vacuum fusion apparatus and permits a determination in a fraction of the time required for making a determination with the vacuum fusion apparatus. The objects of this invention are realized by utilizing a gas chromatography separation step in conjunction with metal sample heating and gas detection steps.

The invention accordingly comprises the apparatus possessing the construction, combination of elements and arrangement of parts, and the method involving the several steps and the relation and the order of one or more of such steps with respect to each of the others which are exemplified in the following detailed disclosure, and the scope of the application of which will be indicated in the claims.

Figure 2:
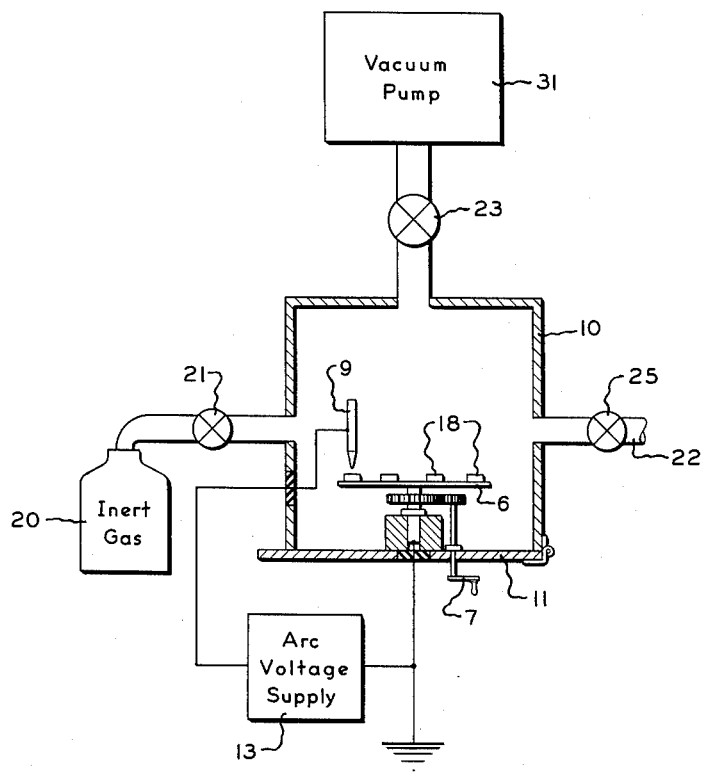

For a fuller understanding of the nature and objects of the invention, reference should be had to the following detailed description taken in connection with the accompanying drawings wherein FIG. 1 is a diagrammatic, sectional, schematic drawing illustrating a preferred embodiment of the invention, and FIG. 2 is a diagrammatic, schematic, sectional drawing showing a variation in the furnace portion of the invention.

The invention comprises the method of and the apparatus for heating a metal sample under such conditions that the gases which it is desired to determine are released from the sample, collecting those gases, passing the collected gases through a gas chromatography column whereby they are separated and detecting the gases as they are discharged from the column.

A. *Heating Metal Samples*

The method and apparatus needed for releasing the particular gas to be determined depends upon the characteristics of the bond of the gas with the metal. Where, for instance, oxygen in a steel sample is to be determined, there are oxides which must be reduced in order to free all of the oxygen. In a preferred embodiment of the invention, the oxides are reduced and the oxygen is released from a steel sample by the method of placing the steel sample in intimate contact with carbon, and heating the carbon and the sample.

The most advantageous method of heating depends upon the particular metal sample involved and the desired mode of operation. Resistance heating of the crucible is an economic method which performs well in most instances. Where higher temperatures and stirring of the melted metal sample in the crucible is desired, and where, for instance, some oxides appear which are particularly difficult to reduce, arc melting of the sample is advantageous.

Where it is desired to analyze a number of metal samples without opening the furnace to the atmosphere, the arc melting method is preferred. With arc melting, a sample turntable provides a means to bring a number of samples successively under the arc giving excellent results.

Induction heating and electron bombardment are other methods which are in some instances suitable for melting the metal samples.

In melting some metal samples and reducing the oxides therein contained, it is preferred to use a metal bath such as tin or platinum in the carbon crucible into which the metal sample is plunged.

For analysis of some gases, such as hydrogen, mere heating is in some cases sufficient to liberate the gas, it being unnecessary to utilize carbon.

B. *Collection of Gases Released by Heating*

In accordance with this invention the gases must be collected as they are released. The heating of the metal sample accordingly is conducted in a gas-tight chamber. Prior to heating the metal sample, the chamber must be cleared of the gases to be determined. As in vacuum fusion analysis, it is possible to heat the sample in a vacuum to release the gases. Subsequent to the release of the gases an inert gas is introduced into the chamber creating a mixture of gases which can be sampled. The particular inert gas used is so selected as to be adequate to serve as carrier gas for the chromatographic separation of the gases released from the metal sample and determination of the particular gas of interest.

Heating in vacuum creates the danger of excessive evaporation of the metal sample with attendant gettering of the gases to be determined, unless the heating is done at relatively low temperatures which permits only slow release of the gases. These disadvantages are circumvented in one embodiment of this invention by heating the sample in the presence of the selected inert atmosphere.

C. *Separation of the Gases Collected*

A flow of the selected inert gas a carrier gas is maintained through a gas chromatography column. A slug of the furnace gas, comprised of the gases released from the sample and the selected inert gas, is introduced into the flow of the carrier gas. The column delays some gases more than others. Thus, when the slug of the gases collected from the sample is flushed through a proper column by a flow of the carrier gas, the outflow from the chromatography column is sequentially combinations of each of the gases in the metal in combination with the carrier gas.

D. *Detection of the Separated Gases*

The outflow from the chromatography column is monitored by a suitable gas chromatography detection method. A common method of monitoring depends upon the phenomenon that the variation in heat conductivity of any binary combination (the carrier gas) is introduced at constant pressure and temperature, is dependent upon the concentration of the other gas present in the carrier gas. A preferred monitoring method, giving greater sensitivity, is a radioactive ionization method using beta particles emitted from tritium as the ionizing particles, described in copending patent application 687,800, filed October 1, 1957. This method depends upon the phenomenon that the amount of ion current produced from the ionization of the outflow from the chromatography column, where the pressure and temperature of the carrier gas is held constant, has a direct relationship to the concentration of the particular gas in the carrier gas which composes the outflow at the time the ion current is meausred. Tritium is the preferred source of ionizing particles because with tritium a very high sensitivity can be achieved with no attendant radiation hazard. High sensitivity is gotten only when the cross-section for ionization of a carrier gas molecule is substantially different from that of the particular gas being detected.

The selection of the carrier gas determines which gases can be easily detected. Thus, where helium is used as carrier gas, since hydrogen has virtually the same heat conductivity and about the same cross-section for ionization, hydrogen can be detected, but with only low sensitivity. Concentrations of carbon monoxide, oxygen and nitrogen are however, detectable in helium, with high sensitivtiy for both the heat conductivity and the cross-section for ionization of helium is substantially different from that of either carbon monoxide, oxygen or nitrogen. When argon is the carrier gas, hydrogen is detectable with good sensitivity.

Referring now to the figures wherein like numbers refer to like elements, the apparatus of this invention and its operation will be described in more detail.

In FIG. 1 there is provided a furnace 10. A sample door 11 is provided in the furnace 10. Extending up from the door of the furnace there are provided two electrical posts 12. An electrical potential is maintained between the posts by battery 14. Suspended between the electrical posts and in electrical contact with them is a carbon crucible 16. One one side of the furnace 10 there is connected an inert gas tank 20 from which an inert gas can be introduced into the furnace by manipulating valve 21. Also connected to the furnace is a gas-removal tube 22. The gas-removal tube is connected to two gas-sampling tubes 26 and 27 through a four-way valve 24. The four-way valve 24 is so arranged that by manipulation it alternatively connects gas-removal tube 22 with one of the gas-sampling tubes 26 and 27 and at the same time an inert gas tank 28 is connected to the other gas-sampling tube. At the other end of the gas-sampling tubes 26 and 27 there is another four-way valve 32 which alternately connects one of the gas-sampling tubes 26 and 27 with a gas chromatography column 34 and the other with a vacuum pump 30. Valve 29 is provided to isolate the vacuum pump 30 from the gas-sampling tube with which it is lined up. The gas chromatography column 34 is filled with a molecular sieve, activated charcoal or other packing selected so that the chromatography column 34 is capable of separating the gas to be analyzed from the other gases in the metal sample. The out-flow end of the gas chromatography column is connected to a detector 36. The detector 36 is connected to a recorder 38.

The operation of the apparatus is as follows: Prior to inserting a sample 18, the furnace 10 is out-gassed. This is accomplished by opening valve 29 and manipulating four-way valves 24 and 32 so that the vacuum pump 30 suction is taken on furnace 10 through one of the gas-sampling tubes 26. Gas-sampling tubes 26 and 27 are interchangeable in function. For more efficient out-gassing a pump 31 is connected through valve 23 to furnace 10. Pump 31 may be a diffusion pump and pump 30 may be a mechanical pump. With such an arrangement the discharge of pump 31 is connected to the intake of pump 30 for efficient operation. By resistance heating the crucible 16 is heated to a temperature on the order of 2400° C. The out-gassing should be permitted to continue for at least a few minutes, the amount of time depending up on the history of the apparatus and the desired accuracy of the determinations ultimately to be achieved. After out-gassing the sample 18 is inserted into the crucible 16 through a sample door 11. After the furnace is evacuated subsequent to insertion of the sample, valve 25 is turned so as to isolate the furnace 10 from the remainder of the system. Vacuum pump 30 is then permitted to evacuate gas-sampling tube 26. When a vacuum on the order of .005 mm. Hg abs. is achieved valve 29 is turned so as to close off gas-sampling tube 26 from the pump 30. Valve 21 is opened and the furnace 10 is filled with inert gas. (If vacuum melting is used for release of the gases, inert gas is not introduced until after the sample is melted.) When oxygen or nitrogen is the gas being determined, the inert gas used in tanks 20 and 28 is preferably helium. Valve 21 is then closed and the sample 18 is melted in the crucible whereby all of the gases in the sample are liberated. Valve 25 is then opened so as to connect gas-removal tube 22 and gas-sampling tube 26 with furnace 10. The vacuum in gas-sampling tube 26 draws a substantial amount of the gas from the furnace 10 into the gas-sampling tube. Thereafter four-way valve 24 is turned to line up gas-sampling tube 26 with inert gas tank 28. Simultaneously four-way valve 32 is turned to connect gas-sampling tube 26 with gas chromatography column 34. The inert gas from the tank 28 flushes the gases in gas-sampling tube 26 into the gas chromatography column 34. Thus, a sharply defined slug of the gases released from the metal sample 18 is injected into a flow of inert gas through the chromatography column 34. The gases liberated from the sample 18 are separated by the gas chromatography column 34 and are detected by the detector 36 and a record thereof made by recorder 38 whereby the gas in the metal sample is determined.

In order to maintain the chromatography column in operable condition it is necessary to constantly maintain a flow of carrier gas through the chromatography column prior to injection of the sample gases. By the valve arrangement shown in FIG. 1, when four-way valves 24 and 32 are so turned as to connect gas-sampling tube 26 with furnace 10 and pump 30, gas-sampling tube 27 serves as a conduit for the maintenance of the flow of carrier gas from inert gas storage tank 28 to the chromatography column 34. When the gases in the gas-sampling tube 26 are to be passed through the chromatography column, four-way valves 24 and 32 are operated simultaneously. By so doing, not only is a substantially constant flow of inert gas maintained, but also subsequent to lining up inert gas tank 28 with gas-sampling tube 26 and gas chromatography column 34 whereby the slug of furnace gases is swept through the chromatography column, gas-sampling tube 27 is lined up with pump 30 and furnace 10 so that the above procedure can be repeated, using gas-sampling tube 27 this time to define the slug of gases to be analyzed from the next sample. This is especially advantageous when the furnace is designed to handle a number of samples without being opened to the atmosphere.

In FIG. 2 there is represented a preferred gas evolution means in which a number of samples can be melted successively without the necessity of exposing the apparatus to the atmosphere between the melting of samples.

In the furnace 10 there is located a holding means 6 for supporting a number of samples 18. As shown the holding means is a turntable. The holding means is preferably electrically grounded. An electrode 9 is supported in the furnace. The electrode 9 is connected to an arc voltage supply 13. The electrode 9 is so positioned with relation to the holding means 6 that by manipulation of a means for imparting relative motion 7 between the electrode 9 and the holding means 6 each of the samples 18 can be successively brought into the proximity of the electrode 9 whereby it is possible to maintain an electrical arc between each of the samples 18 and the electrode 9.

Since certain changes may be made in the above apparatus without departing from the scope of the invention herein involved, it is intended that all matter contained in the above description shall be interpreted as illustrative and not in a limiting sense.

What is claimed is:

1. An apparatus for determining the percent of oxygen and nitrogen in a metal sample, said apparatus comprising a vacuum-tight furnace chamber, means for evacuating said furnace chamber to remove essentially all oxygen and nitrogen therefrom, means for creating in said furnace chamber a predetermined pressure of an inert gas, means in said furnace chamber for heating a metal sample in the presence of carbon to release oxygen in the form of an oxide of carbon and also to release nitrogen, said released gases being diluted by said predetermined pressure of said inert gas to provide a known volume of said gas mixture at a known pressure, a chromatography column having different residence times for different gases, means for providing a flowing stream of said inert gas through said chromatography column at a substantially constant temperature and pressure, means providing for withdrawal of a known aliquot portion of said gas mixture from said furnace chamber into a holding chamber of known volume at a known pressure, valve means permitting insertion of said aliquot portion as a discrete volume into said flowing stream of inert gas so that said aliquot portion passes through said chromatography column at said constant temperature and pressure, and means at the discharge end of the chromatography column for detecting the concentration of nitrogen and carbon oxides in the inert gas at said constant temperature and pressure as the gases leave the chromatography column.

2. An apparatus for determining the percent of oxygen in a metal sample, said apparatus comprising a vacuum-tight furnace chamber, means for evacuating said furnace chamber to remove essentially all oxygen therefrom, means for creating in said furnace chamber a predetermined pressure of an inert gas near atmospheric pressure, means in said furnace chamber for heating a metal sample in the presence of carbon and said inert gas to release oxygen in the form of an oxide of carbon and also to release nitrogen, said released gases being diluted by said predetermined pressure of said inert gas to provide a known volume of said gas mixture at a known pressure, a chromatography column having different residence times for different gases, means for providing a flowing stream of said inert gas through said chromatography column at a substantially constant temperature and pressure, means providing for withdrawal of a known aliquot portion of said gas mixture from said furnace chamber into a holding chamber of known volume at a known pressure, valve means permitting insertion of said aliquot portion as a discrete volume into said flowing stream of inert gas so that said aliquot portion passes through said chromatography column at said constant temperature and pressure, and a radioactive ionization detector located at the discharge end of the chromatography column for detecting the concentration of nitrogen and carbon oxides in the inert gas at said constant temperature and pressure as the gases leave the chromatography column.

References Cited in the file of this patent

UNITED STATES PATENTS

| 2,224,044 | Francis et al. | Dec. 3, 1940 |
| 2,336,075 | Derge | Dec. 7, 1943 |
| 2,795,132 | Boehme et al. | June 11, 1957 |

OTHER REFERENCES

Ray: "J. Appl. Chem.," 4, 82–85 (1954).
Ray: "Nature," 180, 403–5 (1957).
Kaufman et al.: "Anal. Chem." 29, 1032–35 (1957).